Patented Apr. 3, 1951

2,547,194

UNITED STATES PATENT OFFICE 2,547,194

SHORTSTOPPING AGENTS IN EMULSION POLYMERIZATION

Ferdinand B. Zienty, Brentwood, Mo., assignor to Monsanto Chemical Company, St. Louis, Mo., a corporation of Delaware No Drawing. Application September 23, 1949, Serial No. 117,512

6 Claims. (Cl. 260—45.9)

This invention relates to the treatment of emulsion polymerization systems. More particularly it relates to the treatment of an emulsified rubber-like material which consists predominantly of a butadiene-1,3 hydrocarbon with a nitro substituted aromatic thiocyanate in order to retard further polymerization and to produce rubber-like materials of improved properties.

In the preparation of rubber-like materials, hereinafter referred to as synthetic rubbers, by the emulsion polymerization of butadiene hydrocarbons or of butadiene hydrocarbons and vinyl compounds copolymerizable therewith the polymerization is ordinarily not carried to 100% conversion. The reason for this is that as the percent conversion approaches one hundred percent the rate and amount of cross linking markedly increases producing a hard, tough polymer exhibiting relatively poor compounding, milling, extruding, and shaping properties. It has been found that by controlling the extent of polymerization, that is by stopping the polymerization prior to complete conversion of the monomer or monomers, a polymeric material exhibiting properties similar to natural rubber is obtained. However, it has also been found that during the blowing down and stripping operations employed to remove the unreacted monomer or monomers polymerization continues and the polymer becomes hard, increasingly insoluble in benzene, and loses its compounding, milling, extruding, and shaping characteristics.

It has been found in accordance with this invention that nitro substituted aromatic thiocyanates when added to an emulsion system of a synthetic rubber containing predominantly a butadiene hydrocarbon effectively retard or substantially prevent subsequent polymerization, that is, they prevent any appreciable chain growth or cross linking during subsequent process steps necessary for the removal of unreacted monomer components. These materials known as shortstopping agents also exhibit a beneficial softening effect on the polymerized product. The new shortstops are particularly effective in controlling polymerization during the stripping and blowing down operations and like operations subsequent to the emulsion polymerization employed in the manufacture of GR-S, that is the copolymer of butadiene and styrene prepared in the presence of an emulsifying agent, a polymerization catalyst, and an organic modifying agent. In the preparation of this type copolymer polymerization is carried out to at least 50 percent and usually not more than 80 percent by weight based on the total monomer charge, whereupon the unreacted monomers are removed by stripping and blowing out operations.

As exemplary of the invention the following is illustrative and in nowise is to be considered limitative thereof.

*Example*

To suitable pressure vessels were charged respectively:

| System | A | B |
|---|---|---|
| | Parts by weight | Parts by weight |
| Butadiene | 180 | 180 |
| Styrene | 70 | 70 |
| Soap Flakes | 12.5 | 12.5 |
| Potassium Persulfate | 0.75 | 0.75 |
| Dodecyl Mercaptan | 1.25 | 1.25 |
| Water | 625 | 625 |

The systems so prepared were heated at about 40° C. with constant agitation over a period of time such that about 70% by weight of the monomeric materials were polymerized. At the end of this polymerization period approximately 0.5% by weight based on the total monomer charge of 2,4-dinitro phenyl thiocyanate was added in the form of an aqueous emulsion to the polymerization System A while no additive of any kind was added to System B. Both A and B polymerization systems were then agitated for about 18 hours at room temperature. The respective copolymers of A and B were recovered by coagulation, dried, weighed, and examined as to their respective physical properties.

The yield of copolymer of the B system was approximately 7% greater than that of the A system, however, the copolymer of the A system was soft and plastic whereas the copolymer of the B system was hard and tough. Further the copolymer of the A system was about 10% by weight more soluble in benzene than the copolymer of the B system. It was also noted that the copolymer of the A system which was treated with the new short-stopping agent retained almost constant benzene solubility over an extended period of time, thus indicating that substantially no cross-linking was taking place, whereas the copolymer of the B system, which was untreated, deteriorated badly and exhibited decreasing solubility in benzene with time. The copolymer of the A system possessed superior compounding properties to that of the B system.

From the above it is obvious that nitro substituted aromatic thiocyanates are effective retarders of polymerization and cross linking subsequent to completion of the polymerization step and prior to the complete removal of the unreacted monomers. It is also obvious that they produce a stabilized rubber-like polymer possessing improved working properties.

While the above example described the employment of 2,4-dinitro phenyl thiocyanate, any nitro substituted aromatic thiocyanate may be used, as for example, 2-nitro phenyl thiocyanate, 4-nitro phenyl thiocyanate, the nitro substituted tolyl thiocyanates, the nitro substituted biphenyl thiocyanates, the nitro substituted naphthyl thiocyananes, and the like. The new short-stopping agents may be added per se or in solution but are preferably incorporated in the polymerizate emulsion by means of an aqueous emulsion. In general 0.1 to 5% by weight on the original monomer charge is sufficient, however, the amount required to retard polymerization will depend to a certain extent on the molecular weight of the short-stopping agent.

The new short-stopping agents are also effective in retarding polymerization in emulsion systems of rubber-like butadiene-acrylonitrile copolymers when incorporated at the end of the polymerization process. The copolymers of butadiene and acrylonitrile, prepared in the presence of an emulsifying agent and a polymerization catalyst, when treated with the new short stopping agents at the end of the polymerization process retain their rubber-like properties much longer than the untreated copolymers.

While specific embodiments of the invention have been described, it will be understood that many modifications may be made in the processes and compositions of the invention without departing from the spirit or scope thereof.

What is claimed is:

1. The method of making an improved synthetic rubber prepared in an aqueous emulsion and consisting predominantly of a butadiene hydrocarbon which comprises adding a nitro substituted aromatic hydrocarbon thiocyanate containing not more than two nitro groups to the emulsion of the synthetic rubber at the end of the polymerization period whereby additional polymerization of the monomers and cross-linking of the polymer molecules are substantially prevented and a stabilized rubber-like polymer possessing improved working properties is obtained.

2. The method of making an improved synthetic rubber prepared by copolymerizing styrene with a larger amount of butadiene in an aqueous emulsion which comprises adding 0.1 to 5% based upon the weight of the total monomer charge of a nitro substituted aromatic hydrocarbon thiocyanate containing not more than two nitro groups to the emulsion of the synthetic rubber at the end of the polymerization period whereby additional polymerization of the monomers and cross-linking of the polymer molecules are substantially prevented and a stabilized rubber-like copolymer possessing improved working properties is obtained.

3. The method of making an improved synthetic rubber prepared by copolymerizing styrene with a larger amount of butadiene in an aqueous emulsion which comprises adding 0.1 to 5% based upon the weight of the total monomer charge of 2,4-dinitro phenyl thiocyanate to the emulsion of the synthetic rubber at the end of the polymerization period whereby additional polymerization of the monomers and cross-linking of the polymer molecules are substantially prevented and a stabilized rubber-like copolymer possessing improved working properties is obtained.

4. As a new composition of matter an aqueous dispersion comprising a synthetic rubber consisting predominantly of a butadiene hydrocarbon in which is incorporated a small amount of a nitro substituted aromatic hydrocarbon thiocyanate containing not more than two nitro groups.

5. As a new composition of matter an aqueous dispersion comprising a synthetic rubber prepared by copolymerizing styrene with a larger amount of butadiene in which is incorporated a small amount of a nitro substituted aromatic hydrocarbon thiocyanate containing not more than two nitro groups.

6. As a new composition of matter an aqueous dispersion comprising a synthetic rubber prepared by copolymerizing styrene with a larger amount of butadiene in which is incorporated a small amount of 2,4-dinitro phenyl thiocyanate.

FERDINAND B. ZIENTY.

REFERENCES CITED

The following references are of record in the file of this patent:

UNITED STATES PATENTS

| Number | Name | Date |
|---|---|---|
| 2,313,945 | Kellog et al. | Mar. 16, 1943 |